United States Patent Office 3,359,319
Patented Dec. 19, 1967

---

3,359,319
2-[BIS(PERFLUOROALKYL)AMINO]-1,3-BUTADI-
ENES AND PROCESS OF PREPARATION
Frank S. Fawcett, Wilmington, Del., assignor to E. I. du
Pont de Nemours and Company, Wilmington, Del., a
corporation of Delaware
No Drawing. Filed May 7, 1965, Ser. No. 454,159
12 Claims. (Cl. 260—583)

This invention relates to a new class of fluorinated 1,3-butadienes, to their preparation, and to polymers thereof.

More specifically, this invention relates to 2-[bis(perfluoroalkyl)amino]-1,3-butadienes having the formula $$R_f-N-R'_f$$
$$X_2C=C-CH=CX_2$$

wherein $R_f$ and $R_f'$ are perfluoro(lower alkyl of 1 to 6 carbon atoms) and X is hydrogen or fluorine. The monomers of this invention are useful as solvents for organic polymers, especially fluorinated polymers, and more particularly fluorinated polymers which are utilized as films, coatings, and the like. The butadienes of this invention also exhibit utility as monomers for the preparation of homopolymers and copolymers with dienes or other copolymerizable ethylenic compounds. Moreover, the fluorinated 1,3-butadienes of this invention are more resistant towards hydrolysis than are similar prior art fluorinated 1,3-butadienes. The homopolymers and also the copolymers containing a major amount of one of the copolymerized monomers of this invention exhibit elastomeric properties typical of the 1,3-butadiene-type polymers. The polymers of this invention, also, have been found useful as adhesives.

The 2 - N,N-bis(perfluoroalkyl)amino-1,3-butadienes of this invention can be prepared by either of two methods. The first method is especially useful for the preparation of dienes of the above formula wherein X is hydrogen. This route is exemplified by the following equations:

Step A: 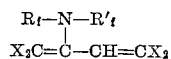

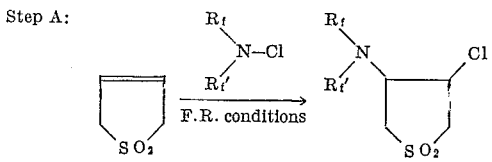

Step B:

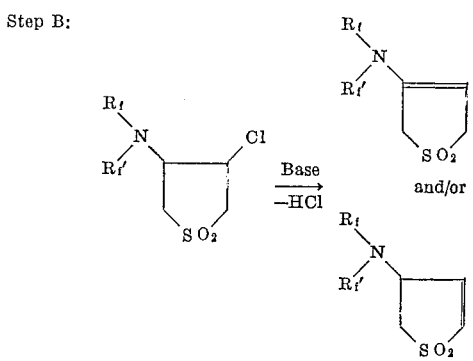

Step C:

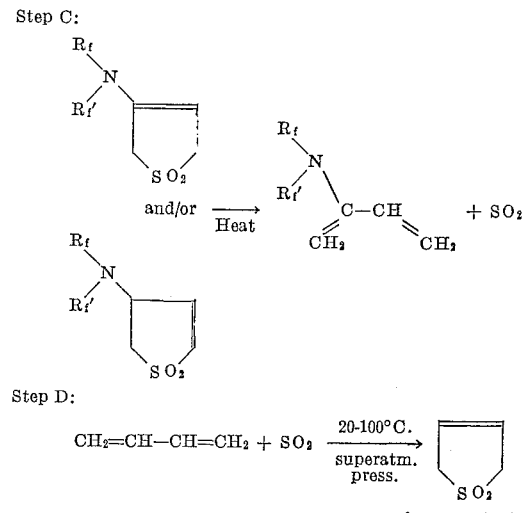

Step D:

$$CH_2=CH-CH=CH_2 + SO_2 \xrightarrow[\text{superatm. press.}]{20\text{-}100^\circ C.} \boxed{SO_2}$$

for re-use in Step A

Step A involves the addition of an N-chlorobis(perfluoroalkyl)amine to an unsaturated cyclic sulfone to form an intermediate N,N-bis(perfluoroalkyl)amino-chloro-cyclic sulfone. In Step B, this above-mentioned sulfone is treated with a basic reagent to remove the elements of hydrogen and chlorine to introduce a double bond into the cyclic sulfone. In Step C, the unsaturated product of Step B is thermally decomposed to generate the diene product, along with sulfur dioxide as a coproduct. In the final Step D, the sulfur dioxide is converted with 1,3-butadiene back to the butadiene cyclic sulfone starting material for Step A, thus completing the cyclic operation. The reactants consumed are 1,3-butadiene and the N-chlorobis(perfluoroalkyl)amine.

In carrying out the reaction of Step A, the ratio of reactants is ordinarily 1:1 on a molar basis, although this proportion is not critical. A slight excess of about 10% of either reactant may be used satisfactorily. With a volatile chloroamine compound, this reactant is ordinarily used in excess to favor complete conversion of the unsaturated compound and thereby aid in the isolation of the product inasmuch as the volatile chloroamine which is in excess of that consumed is readily recoverable. The reaction of Step A is brought about by the use of general free-radical reaction conditions, such as irradiation by ultraviolet light or sunlight. Under these conditions, quartz apparatus is a preferred material of construction for that part of the reaction vessel which separates the reactants from the light source, and the reaction is ordinarily carried out at atmospheric pressure and the ambient temperature generated by the exposure to the light source. With low-boiling reactants or solvents a suitably cooled reflux condenser may be used to prevent loss of volatile components, and this will also serve to dissipate the heat of the reaction. One form of light source that is satisfactory is a low-pressure mercury vapor lamp made of quartz. It may be arranged as a coil either around a quartz reaction zone within which the reactants are held or through which they flow, or the lamp may be compactly coiled inside a well which in turn is immersed in the reaction zone. In the latter instance, the confining vessel for the reactants may be constructed of metal, for example one of the resistant alloys such as Hastelloy. The use of quartz as described above gives efficient transmission of the active light into the reactants and thus promotes rapid reaction rates. The reaction time may vary from a few minutes to several hours, depending upon the temperature and other reaction conditions. Alternatively, the reaction may be carried out by heating the reactants in the presence of a free-radical generator such as a peroxide or an azo compound. The reaction may be carried out in the presence of an inert solvent although this is not essential. The use of a solvent facilitates the reaction by aiding physical and thermal contact among the reactants. Suitable solvents include liquid lower halogenated compounds such as those which are commercially available under the trademark "Freon," carbon tetrachloride, or other inert solvents. The reactants may be incompletely soluble in the solvent initially, since as the dissolved portion reacts an additional amount will dissolve. The temperature at which the reaction is carried out is in general from about 0° C. to 200° C. Higher temperatures favor the formation of undesirable side products and therefore are less desirable. For the ultraviolet- or sunlight-induced reaction, the preferred temperature range is 0-50° C., while with free-radical generators the preferred range is in general 40-125° C. Stirring or agitation is used to aid in mixing the reaction materials. The reaction may be carried out under elevated pressure, especially with free-radical generators, for example, in a sealed vessel constructed of either glass or metal resistant to the reactants involved. The end point of the reaction may be recognized by determining the extent of utilization of the chloroamine compound, such as by periodically withdrawing samples and analyzing them, e.g., by gas chromatography, for the presence of unreacted chloroamine. The reactants, solvents and equipment used are preferably dry since the presence of moisture results in loss of some of the chloroamine by hydrolysis.

The reaction of Step B is carried out by treating the product of Step A, preferably in a solvent such as one of the lower alcohols, for example, ethanol, with a base such as sodium hydroxide or potassium hydroxide at a temperature in the range 0-100° C., preferably in the range 10-40° C. The end point of the reaction is recognized by determining the consumption of the basic reagent, for example, by removal of aliquot portions periodically and titration for excess basic reagent, or by the use of an internal or external indicator such as phenolphthalein, which shows the end point of the reaction by a color change when excess basic reagent persists. Although the addition of exactly the stoichiometric amount of base is not critical for the accomplishment of Step B, it is preferred that the reactants be utilized in their proper ratio to facilitate the isolation of the product in a more pure form. A small excess, up to about 10%, of the basic agent may be used to favor complete conversion of the more expensive organic reactant.

The structure of the product of Step B is indicated to be either a 3-N,N-bis(perfluoroalkyl)amino-2,5-dihydrothiophene - 1,1 - dioxide or 3-N,N-bis(perfluoroalkyl)amino-2,3-dihydrothiophene-1,1-dioxide or a mixture of the two. The structure of the product in most cases is believed to be the 2,5-isomer. In any event, the process is not to be limited by the incomplete characterization of the intermediate product since the intermediate actually obtained is convertible in the succeeding steps to the desired final diene products.

In the reaction of Step C, the product obtained from Step B, which may be either of the isomers or a mixture of the two, is heated alone or in an inert solvent, for example, a high-boiling hydrocarbon such as a mineral oil or a high-boiling chlorinated aromatic derivative, to bring about the decomposition to the desired diene and sulfur dioxide. The reactant may be heated either in the presence or absence of an acidic catalyst such as toluenesulfonic acid, as shown in the examples below. If a solvent is used, it should be such that its boiling point is high enough to promote the thermal decomposition reaction but at the same time it should be readily separable from the products. The pyrolysis reaction is conducted by heating the mixture to a temperature where the volatile product is evolved, as evidenced by its appearance in a condensing system. A reaction temperature of from 50° C. to 400° C. is used, preferably 100-250° C. The decomposition may be carried out either under atmospheric, elevated, or reduced pressure, as desired, to regulate the decomposition temperature and the volatilization of the products from the reaction zone. Decomposition at atmospheric pressure is a preferred method of operation because simpler and less costly equipment is required. This reaction may be carried out either as a batch operation or as a continuous flow process. The mixture is heated for a period of time sufficient to cause decomposition of a substantial amount of the product and any unconverted reactant may be recovered and recycled. With a flow process a higher temperature is used along with a shorter reaction time. Reaction times of from a few seconds up to 1 hour or more may be used, depending upon the reaction temperature employed. The decomposition can be judged by the progress of the collection of the volatile material being produced, and its cessation indicates the practical end point of the process of Step C.

The reaction of Step D has been described in the literature, for example, H. Staudinger and B. Ritzenthaler, Ber. B68, 455, especially at p. 462 (1935).

A method for the preparation of the dienes of the formula indicated hereinabove where X is fluorine involves a two-step process which is exemplified in the following equations:

Step A:

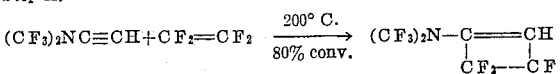

Step B:

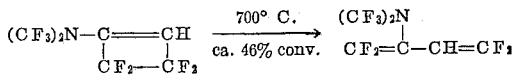

In the first step, an N-ethynyl-bis(perfluoroalkyl)amine is reacted with tetrafluoroethylene at a temperature of about 200° C. under autogenous pressure to form a substituted cyclobutene derivative according to the general method of Coffman, Barrick, Cramer and Raasch, J. Am. Chem. Soc., 710, 490 (1948). In step two of this process, the cyclobutene derivative prepared above is pyrolyzed according to the method of Anderson, as described in U.S. Patent 2,743,303 to form the diene of the general formula of this invention where X is fluorine.

The N-chlorobis(perfluoroalkyl)amines used as starting materials for the preparation of the products of this invention can be prepared by various methods. Thus, N-chlorobis(trifluoromethyl)amine can be prepared from bis(trifluoromethyl)amine and chlorine under anhydrous conditions as described in U.S. Patent 3,052,723. Other N-chlorobis(perfluoroalkyl)amines can be prepared by chlorination of N-trifluoromethyl-N-perfluoroethylamine and higher di or bis(perfluoroalkyl)amines prepared in turn from the appropriate perfluoroazomethines or imines, having a C=N group, by reaction with hydrogen fluoride in accordance with the method described in U.S. Patent 2,643,267. An alternative method for preparing N-chlorobis(perfluoroalkyl)amine starting materials consists in reaction of mercuric fluoride with a perfluoroazomethine to form a bis-mercury derivative followed by reaction of the latter with chlorine as described by Young, Tsoukalas and Dresdner, J. Am. Chem. Soc., 80, 3604 (1958).

The preparation of the cyclic sulfone intermediates required herein has been described in the literature, for example, Staudinger and Ritzenthaler, Ber., B68, 455, especially at p. 462 (1935). This reference describes specifically the preparation of butadiene cyclic sulfone which is the preferred reactant in the present process.

The preparation of N-ethylnylbis(perfluoroalkyl) amines involves dehydrohalogenation of an N-(2-chlorovinyl)-bis(perfluoroalkyl)amine which in turn is prepared, for example, either by addition of an N-chlorobis (perfluoroalkyl)amine (preparation described above) to aceytlene, or by addition of an N-chlorobis(perfluoroalkyl)amine to vinyl chloride followed by elimination of hydrogen chloride. Further details of the reaction involving an N-chlorobis(perfluoroalkyl)amine and acetylene may be found below in Example I. The reaction involving the addition of an N-chlorobis(perfluoroalkyl)amine to vinyl chloride is described below in Example II. Finally, the process of dehydrohalogenation of the N-(2-chlorovinyl)bis(perfluoroalkyl)amines is shown in Example III below.

The products of this invention are useful for the preparation of homopolymers as well as copolymers with other dienes or copolymerizable ethylenic monomers, as shown in the succeeding examples. Such polymers can be prepared by conventional polymerization techniques; the polymers are useful as adhesives or as elastomers. Thus, 2-N,N-bis(trifluoromethyl)amino - 1,3 - butadiene forms a homopolymer when treated with an azonitrile free-radical initiator at about 60° C. under autogenous pressure. Under similar conditions can be formed a copolymer thereof with chloroprene.

The products of this invention are illustrated in greater detail by the following examples in which the proportions of ingredients are expressed in parts by weight unless otherwise specified.

*Example I.—Preparation of N-(2-chlorovinyl)bis (trifluoromethyl)amine*

A mixture of 35 g. of N-chlorobis(trifluoromethyl) amine and 5.0 g. of acetylene is heated in a closed reaction vessel capable of withstanding high pressures at 175° C. for 5 hours, during which time the autogenous pressure drops from 600 to 325 lb./sq. in. Another mixture of the same reactants in the same proportion is heated similarly during which the autogenous pressure drops from 700 to 490 lb./sq. in. The combined liquid reaction products from both these runs amounts to 50 g. of a fluid, yellow liquid. Distillation of this crude product gives 20 g. (27% conversion) of the 1:1 adduct, N-(2-chlorovinyl)bis(trifluromethyl)amine, boiling at 50–62° C. Preparative scale gas chromatographic separation of this distilled product yields the two cis and trans isomers, the major one having the shorter retention time. The fluorine nuclear magnetic resonance spectra for both isomers show the presence of $CF_3$. The major isomer shows absorption at 3.24 microns (=CH) and at 6.10 microns (C=C).

*Analysis.*—Calc'd. for $C_4H_2F_6ClN$: F, 53.5; Cl, 16.6. Found: Major isomer, F, 53.71; Cl, 17.5, 18.6; minor isomer, F, 53.0.

*Example II.—Preparation of N-(2-chlorovinyl)bis (trifluoromethyl)amine*

A. A liquid mixture of 19 g. of vinyl chloride and 55 g. of N-chlorobis(trifluoromethyl)amine in a quartz reactor is stirred under reflux (the condenser cooled with solid carbon dioxide) and irradiated for 5 hours by means of an external coiled mercury ultraviolet lamp. During the early period of irradiation the mixture refluxes actively and after 45 minutes the refluxing essentially ceases. At the end of the five hours, the liquid product, amounting to 72 g., is distilled and there is obtained 67 g. of N-(2,2-dichloroethyl)bis(trifluoromethyl) amine (92% conversion), boiling at 91–96° C. The fluorine nuclear magnetic resonance spectrum shows a single fluorine resonance for $CF_3$ and the proton nuclear magnetic resonance spectrum shows a small triplet resonance for CH and a larger doublet resonance $CH_2$, which show the structure to be $(CF_3)_2NCH_2CHCl_2$.

*Analysis.*—Cal'cd. for $C_4H_3Cl_2F_6N$: F, 45.7; Cl, 28.6. Found: F, 45.33; Cl, 28.55.

B. A mixture of 25 g. of N-(2,2-dichloroethyl)bis(trifluoromethyl)amine and 45 g. of anhydrous potassium acetate in 75 ml. of N,N-dimethylformamide is stirred and heated under a fractionating column arranged for removal of distillate. During two hours there is collected a forerun of 2.16 g. boiling at 36–52° C. and then 17.7 g. of distillate boiling at 52–59° C. The latter is washed with dilute aqueous hydrochloric acid, with water, dried over anhydrous sodium sulfate and redistilled. There is obtained 14.8 g. of colorless distillate (70% conversion), B.P. 56–65° C., identified by means of infrared and nuclear magnetic resonance spectra and by gas chromatographic retention times as N-(2-chlorovinyl)bis(trifluoromethyl)amine (cis and trans isomers).

*Example III*

A mixture of 16 g. of N-(2-chlorovinyl)bis(trifluoromethyl)amine (mixed isomers), 100 ml. of methylcyclohexane and 60 g. of micropulverized potassium hydroxide is stirred and heated under reflux with provision for collecting volatile reaction products in a trap cooled with a solid carbon dioxide-acetone mixture. After 6 hours of refluxing there is obtained 6.4 ml. of volatile product in the cold trap. A duplication of this reaction gives another 5.9 ml. of volatile reaction product. The two products are combined and subjected to fractional distillation. There is obtained a central fraction boiling at 3.5° C. of N-ethynylbis(trifluoromethyl)amine amounting to 7 g.

*Analysis.*—Calc'd for $C_4HF_6N$: F. 64.3. Found: F, 64.96, 64.80.

The structure is confirmed by infrared and nuclear magnetic resonance spectroscopy. Infrared bands are present at $3.0\mu$ (≡CH), $4.6\mu$ (—C≡C—) and at $7$–$9\mu$ (CF, strong). The fluorine n-m-r spectrum shows a peak for $CF_3$ at $-295$ cps. from sym.-difluorotetrachloroethane reference, and the proton n-m-r spectrum shows a single resonance for C≡CH at $-130$ cps. from tetramethylsilane reference. An additional portion obtained in the distillation having a boiling range of 0 to 9° C. amounts to 10.5 g. The total amount of N-ethynylbis(trifluoromethyl)- amine obtained amounts to 17.5 g. (60% conversion).

*Example IV.—2,2,3,3 - tetrafluoro-N,N-bis(trifluoromethyl)aminocyclobutene*

An 80 ml. Hastelloy-lined pressure reactor was charged with 8 g. of N-ethynyl-N,N-bis(trifluoromethyl)amine and 12 g. of tetrafluoroethylene and heated with shaking at 200° C. for 8 hrs. The volatile products were vented at room temperature and the remaining liquid was distilled to give 9.7 g. of the above cyclobutene, B.P. 82–83° C., identified by means of its infrared and nuclear magnetic resonance spectra.

*Analysis.*—Calc'd for $C_6HF_{10}N$: C, 26.03; H, 0.36; F, 68.6. Found: C, 26.72; H, 0.59; F, 67.42.

*Example V*

Example IV was repeated with different quantities of reactants as shown in the following table. In each case the product obtained was identical to the one in Example IV, as determined by comparison of boiling points and/ or infrared analyses.

| Grams Acetylene cpd. | Grams TFE | Reactor Volume, ml. | Distilled Product |
|---|---|---|---|
| 10 | 15 | 80 | Combined, 28.7 g. B.P. 83° C. |
| 14 | 30 | 80 | |
| 25 | 55 | 240 | 29 g., B.P. 82–83° C. |

*Example VI.—2-N,N-bis(trifluoromethyl)amino-1,1,4,4-tetrafluoro-1,3-butadiene by pyrolysis of 2,2,3,3-tetrafluoro-N,N-bis(trifluoromethyl)aminocyclobutene*

A vertical "Vycor" pyrolysis tube 25 mm. O.D. x 50 cm. long was packed for a 24 cm. length with pieces of quartz tubing (6 mm. O.D. x 5 mm. length) and heated in a furnace at 695–700° C. The lower (exit) end of the tube was connected in turn to traps cooled in solid carbon dioxide and in liquid nitrogen and to manometers and a pumping system adjusted to maintain 20 mm. pressure. During 25 minutes, 15.5 g. of the cyclobutene formed in Example V was added to the top of the tube from a dropping funnel. The combined material collected in the traps, amounting to 9 ml. (14 g.) of pale yellow liquid at room temperature, was distilled to give 7.19 g., B.P. 56–65° C., and 4.71 g., B.P. 65–84° C. (presumably contains recovered starting materials). Gas chromatography of the lower boiling material showed the presence of two components, which were separated by preparative gas chromatography to give a forerun eluting at 13.2 min. and the major product eluting at 17.4 min. The latter was identified as the butadiene by means of infrared, nuclear magnetic resonance and ultraviolet spectra. This diene on treatment with water at room temperature formed a clear lower (heavier) layer and showed no visible or thermal evidence of reaction.

*Analysis.*—Calc'd for $C_6HF_{10}N$: F, 68.6; N, 5.05. Found: F, 66.95; 66.45; N, 5.21.

*Example VII.—3-N,N-bis(trifluoromethyl)amino-4-chlorotetrahydrothiophene-1,1-dioxide*

A mixture of 20 g. of butadiene cyclic sulfone, 60 ml. of carbon tetrachloride and 30.5 g. of N-chlorobis(trifluoromethyl)amine gave a dark colored heterogeneous slurry which was stirred and irradiated with a mercury U.V. lamp for 5.5 hours. The solid dissolved during this period. The solution was treated with "Darco" G-60 and filtered through "Celite" to give an orange-colored filtrate. The filtrate was concentrated, diluted with petroleum ether, and cooled to give 41 g. of light tan crystals of the 1:1 adduct, M.P. 58.1–60.2° C. A sample recrystallized three times from carbon tetrachloride/pentane separated as soft crystals, M.P. 62.5–63.3° C. The infrared and nuclear magnetic resonance spectra showed the product to be the adduct 3-N,N-bis(trifluoroethyl)amino-4-chlorotetrahydrothiophene-1,1-dioxide.

*Analysis.*—Calc'd for $C_6H_6F_6NClSO_2$: C, 23.58; H, 1.98; F, 37.29. Found: C, 23.93; H, 2.16; F, 37.43.

*Example VIII*

The process of Example VII above was repeated using 30 g. of butadiene cyclic sulfone, 90 ml. of carbon tetrachloride and 48 g. of N-chlorobis(trifluoromethyl)amine. Irradiation for a period of 10 hours under reflux maintained by a solid carbon dioxide-cooled condenser gave, after isolation as above, 63 g. of the adduct, M.P. 60.2–61.4° C.

*Example IX.—3-N,N-bis(trifluoromethyl)amino-2,5-(or 2,3)-dihydrothiophene-1,1-dioxide*

3-N,N-bis(trifluoromethyl)amino-4-chlorotetrahydrothiophene-1,1-dioxide (1.0 g.) was dissolved in 25 ml. of absolute ethanol and treated at room temperature with an ethanolic potassium hydroxide solution (prepared from 2.5 g. of 85% KOH pellets in 5 ml. of water diluted with 95 ml. of ethanol). With phenolphthalein indicator, 9.5 ml. of the solution was required to give a permanent, slightly alkaline reaction. A finely divided solid precipitated during the reaction. The mixture was made neutral with a few drops of ethanolic HCl and filtered, and the filtrate was concentrated to dryness to give 0.86 g. of tan crystalline plates. Recrystallization from chloroform yielded a first crop of 0.3 g. of white crystals, M.P. 127.2–130.8° C. and a second crop, after pentane dilution, of 0.3 g. of tan crystals, M.P. 126.0–127.8° C. Recrystallization of the combined products from chloroform/pentane gave 0.35 g. of colorless plates of 3-N,N-bis(trifluoromethyl)amino-2,5- (or 2,3)-dihydrothiophene-1,1-dioxide, M.P. 127.0–128.0° C., identified by infrared and nuclear magnetic resonance spectra.

The proton nuclear magnetic resonance data indicate that the product is probably the 2,5-dihydro isomer.

*Analysis.*—Calc'd for $C_6H_5F_6NSO_2$: C, 26.77; H, 1.87. Found: C, 27.34, 27.48; H, 2.15, 2.19.

*Example X*

The process of Example IX above was repeated using 20 g. of the amino-chlorotetrahydrothiophene derivative, 125 ml. of ethanol solvent and 190 ml. of a potassium hydroxide solution (prepared from 5 g. of potassium hydroxide, 10 ml. of water and 190 ml. of absolute ethanol). The resulting reaction mixture was filtered, and the fitrate on concentrating to dryness and extraction with chloroform (hot) gave 8.57 g. of product. Extraction of the original solid filtered from the reaction mixture with hot chloroform gave an additional 5.63 g. of product or a total of 14.20 g. The melting points of these products were, respectively, 124.4–127.8° C. and 126.2–128.6° C.

*Example XI*

The process of Example IX was repeated using 50 g. of the amino-chloro adduct, 315 ml. of ethanol and 480 ml. of potassium hydroxide solution (prepared from 10 parts of potassium hydroxide pellets, 20 ml. of water and 380 ml. of ethanol). This example yielded 35.84 g. of product which was identified as the same material obtained above.

*Example XII.—2-N,N-bis(trifluoromethyl)amino-1,3-butadiene*

A mixture of 12.55 g. of 2-N,N-bis(trifluoromethyl)-amino-2,5-(or 2,3)-dihydrothiophene-1,1-dioxide (from Ex. X) and 2.1 g. of p-toluenesulfonic acid monohydrate was mixed with mortar and pestle and charged to a 100 ml. flask with provisions for collecting volatile material in a trap cooled with solid carbon dioxide. The solid mixture was heated gently during 15 minutes with a free flame and as it melted, gas evolution occurred and volatile products collected in the trap. When gas evolution subsided, the system was evacuated briefly and there was obtained 7.3 ml. of cloudy liquid in the trap. Transfer of the volatile material to a second trap at room temperature gave 2 ml. of distillate, identified as sulfur dioxide by gas chromatography, by its B.P. −7 to −5° C., and by its odor. The residue of 5.3 ml. of colorless liquid was washed with cold water, with cold dilute sodium bicarbonate, again with water, and dried over sodium sulfate. Distillation at atmospheric pressure with a spinning band column (6.0 g. charge) gave 5.19 g. of the diene, B.P. 65–66° C., identified by means of its infrared, ultraviolet and nuclear magnetic resonance spectra.

*Analysis.*—Calc'd for $C_6H_5F_6N$: C, 35.13; H, 2.46; F, 55.58. Found: C, 35.51; H, 3.02; F, 56.17.

*Example XIII*

This example illustrates the formation of the diene product in the absence of p-toluenesulfonic acid.

The reaction of Example XII was carried out with 23 g. of 2-N,N-bis(trifluoromethyl)amino-2,5- (or 2,3)-dihydrothiophene-1,1-dioxide by heating gently with a free flame during 20 minutes. The material melted and evolved gaseous product which was collected in a receiver cooled with solid carbon dioxide and which amounted to 16 ml. of liquid as two layers. When the condensed material was allowed to warm to room temperature, there was volatilized 3.8 ml. of a colorless liquid which solidified in a second trap cooled with solid carbon dioxide. This was identified as sulfur dioxide by its B.P. −7° to −5° C. and by gas chromatography. The residual liquid in the trap, after it had been warmed to room temperature, amounted to 11 ml. or 12 g. This liquid was washed in a separatory funnel with water, rinsed with cold dilute sodium bicarbonate solution and finally again with water several times until neutral. After drying over sodium sulfate and filtering, the diene product was redistilled giving 10.68 g., B.P. 66–67° C., at atmospheric pressure. Infrared and gas chromatography showed this diene to be the same product as that obtained in Example XII.

The above examples have illustrated the products of this invention by reference to the preparation of specific compounds covered by the general formula given hereinabove. Other specific 2-[bis(perfluoroalkyl)amino]-1,3-butadienes which can be prepared by the procedures illustrated above include the compounds shown in the following Tables I and II.

TABLE I.—PREPARATION OF 2-[BIS(PERFLUOROALKYL)AMINO]-1,1,4,4-TETRAFLUORO-1,3-BUTADIENES

| Starting Material for Reaction with Tetrafluoroethylene | Intermediate Cyclobutene Derivative | Diene Product |
| --- | --- | --- |
| $CF_3CF_2-N-C\equiv CH$<br>$\quad\quad\quad\mid$<br>$\quad\quad\quad CF_3$ | $CF_3CF_2-N\text{------}C=\text{=}CH$<br>$\quad\quad\quad\mid\quad\quad\mid$<br>$\quad\quad\quad CF_3\quad CF_2-CF_2$ | $CF_3CF_2N\text{----}C\text{----}CH$<br>$\quad\quad\quad\mid\quad\parallel\quad\parallel$<br>$\quad\quad\quad CF_3\ CF_2\ CF_2$ |
| $(CF_3CF_2CF_2)_2N-C\equiv CH$ | $(CF_3CF_2CF_2)_2N-C=\text{=}CH$<br>$\quad\quad\quad\quad\quad\quad\quad\quad\mid\quad\mid$<br>$\quad\quad\quad\quad\quad\quad\quad\quad CF_2-CF_2$ | $(CF_3CF_2CF_2)_2N-C\text{----}CH$<br>$\quad\quad\quad\quad\quad\quad\quad\quad\parallel\quad\parallel$<br>$\quad\quad\quad\quad\quad\quad\quad\quad CF_2\ CF_2$ |

TABLE II.—PREPARATION OF 2-[BIS(PERFLUOROALKYL)AMINO]-1,3-BUTADIENES

| Starting Material For Reaction with Butadiene Cyclic Sulfone | Diene Product |
| --- | --- |
| $CF_3CF_2-N-Cl$<br>$\quad\quad\quad\mid$<br>$\quad\quad\quad CF_3$ | $CF_3CF_2-N-C-CH=CH_2$<br>$\quad\quad\quad\mid\ \ \parallel$<br>$\quad\quad\quad\mid\ \ CH_2$<br>$\quad\quad\quad CF_3$ |
| $CF_3CF_2-N-Cl$<br>$\quad\quad\quad\mid$<br>$\quad\quad\quad CF_3CF_2$ | $CF_3CF_2-N-C-CH=CH_2$<br>$\quad\quad\quad\mid\ \ \parallel$<br>$\quad\quad\quad\mid\ \ CH_2$<br>$\quad\quad\quad CF_3CF_2$ |
| $CF_3CF_2CF_2CF_2-N-Cl$<br>$\quad\quad\quad\quad\quad\quad\mid$<br>$\quad\quad\quad\quad\quad\quad CF_3$ | $CF_3CF_2CF_2CF_2-N-C-CH=CH_2$<br>$\quad\quad\quad\quad\quad\quad\mid\ \ \parallel$<br>$\quad\quad\quad\quad\quad\quad\mid\ \ CH_2$<br>$\quad\quad\quad\quad\quad\quad CF_3$ |
| $(CF_3CF_2CF_2)_2N-Cl$ | $(CF_3CF_2CF_2)_2N-C-CH=CH_2$<br>$\quad\quad\quad\quad\quad\quad\quad\quad\parallel$<br>$\quad\quad\quad\quad\quad\quad\quad\quad CH_2$ |
| $(CF_3)_2CF-N-Cl$<br>$\quad\quad\quad\mid$<br>$\quad\quad\quad CF_3$ | $(CF_3)_2CF-N-C-CH=CH_2$<br>$\quad\quad\quad\quad\mid\ \ \parallel$<br>$\quad\quad\quad\quad\mid\ \ CH_2$<br>$\quad\quad\quad\quad CF_3$ |
| $[CF_3(CF_2)_5]_2-N-Cl$ | $[CF_3(CF_2)_5]_2N-C-CH=CH_2$<br>$\quad\quad\quad\quad\quad\quad\quad\parallel$<br>$\quad\quad\quad\quad\quad\quad\quad CH_2$ |

The following experiments illustrate the use of the products of this invention in the preparation of polymers.

*Example XIV.—4-N,N-bis(trifluoromethyl)amino-1,2,3,6-tetrahydrophthalic anhydride and copolymer*

A mixture of 1.77 g. of 2-N,N-bis(trifluoromethyl)-amino-1,3-butadiene, 0.085 g. of maleic anhydride, and 1.5 ml. of benzene was sealed in a Pyrex tube (8 mm. I.D. x 200 mm. long) and heated at 60–70° C. for 1 hr. and at 100° C. for 6.5 hrs. The clear, colorless liquid was concentrated, diluted with petroleum ether and cooled to give 2.1 g. of white solid. Sublimation of a 1.9 g. portion at 100° C./1 mm. gave 1.49 g. of sublimate as a first crop and 0.24 g. additional sublimate. Recrystallization of the sublimate from ethylene dichloride-petroleum ether gave the anhydride, M.P. 49.6–50.2° C., M.P. unchanged on resublimation (mixed M.P. with maleic anhydride was depressed). The identity of the 4-N,N-bis(trifluoromethyl)-amino-1,2,3,6-tetrahydrophthalic anhydride was confirmed by means of its infrared and nuclear magnetic resonance spectra.

*Analysis.*—Calc'd for $C_{10}H_7F_6NO_3$: C, 39.61; H, 2.33; Sap. Eq. 151.6. Found: C, 39.92; H, 2.51; Sap. Eq. 151.

A coproduct with this Diels-Alder adduct was a polymer. The residue from the above sublimation was a horny polymeric material. A portion removed from the apparatus by briefly rinsing with 2 N sodium carbonate solution and washing with water and drying was obtained in the form of clear, transparent flexible films. These films could be manually cold drawn. Infrared examination showed the presence of both components, i.e. a copolymer of the diene and maleic anhydride.

*Example XV.—Polymerization of 2-N,N-bis(trifluoromethyl)amino-1,3-butadiene*

A mixture of 2-N,N-bis(trifluoromethyl)amino-1,3-butadiene (.66 g.) and 0.006 g. of α,α'-azobis(isobutyronitrile) was sealed in an atmosphere of nitrogen in a small glass tube under autogenous pressure. On heating to 78–80° C. the initiator dissolved in the monomer and the tube and contents were heated in a liquid bath at 80° C. for 10 hrs. After cooling, the reaction mixture was a moderately viscous, clear, colorless liquid. The tube was opened and the product extracted with methanol several times by heating on a steam bath, and the resulting washed polymer was dried under reduced pressure at 100° C. to yield 0.29 g. of a clear, viscous, sticky, semisolid polymer. The polymer was not soluble in hot xylene; it was soluble in hot perfluorotributylamine but reprecipitated on cooling. Infrared examination of the polymer showed absorption for saturated CH at 3.38 and 3.48μ, strong absorption in the 7.5–9μ region for CF and absorption at 5.98μ for C=C. The spectrum indicated the absence of terminal vinyl groups that correspond to 1,2-polymerization thus indicating the polymer to have a 1,4-structure.

*Example XVI*

The reaction of Example XV above was repeated using 0.50 g. of the monomer and 0.025 g. of the catalyst initiator with a similar heating period. After vacuum drying, there was obtained 0.36 g. of a clear, viscous, sticky, semisolid polymer similar to that obtained in Example XV above. Infrared examination of this polymer showed essentially the same results as that obtained for polymer of Example XV. The major difference in these two examples is the higher conversion in the latter.

*Example XVII*

In a Pyrex glass tube 200 x 8 mm. I.D. x 10 mm. O.D. was placed 0.8 ml. (0.99 g.) of 2-N,N-bis(trifluoromethyl)amino-1,3-butadiene and 0.5 ml. of chloroprene (freshly distilled from its inhibitor) and 0.05 g. of α,α'-azobis(isobutyronitrile). The tube was sealed under reduced pressure with cooling and then placed in a water bath at 75–80° C. for 7 hrs. On cooling the tube and opening it, there was obtained a white, soft polymer. It was extracted with methanol three times, dissolved in hot benzene, and reprecipitated by pouring into methanol. Vacuum drying gave 1.27 g. of the white, tacky polymer. Analysis of the polymer showed it to be a copolymer of the two diene monomers; thus, it showed 30.97% fluorine and 16.41% chlorine. Infrared examination of this copolymer showed it to be similar to those described in the earlier experiments.

*Example XVIII*

The procedure of Example XVII above was repeated with the exception that 0.5 g. of the diene monomer and 0.025 g. of the azonitrile catalyst were used. After heating at 75–80° C. for 7 hrs., the polymer tube was cooled and opened. The polymer obtained was a soft, viscous mass.

After extraction with methanol three times and vacuum drying, there was obtained a viscous, clear, liquid copolymer of the two diene monomers amounting to 0.35 g.

As indicated above, the products of this invention are useful as solvents in their monomeric form, and after conversion to polymers, as adhesives. The following examples corroborate this utility.

*Example XIX*

A piece of medium porosity filter paper was dipped into a solution of polytetrafluoroethylene in 2-N,N-bis(difluoromethyl)amino - 1,1,4,4 - tetrafluoro-1,3-butadiene. This solution was prepared by dissolving 0.005 g. of the polytetrafluoroethylene in 0.37 g. of the diene by warming for five minutes in a water bath at 45° C. The filter paper was removed from the solution and allowed to air dry. The treated filter paper was water repellent as confirmed by the fact that a drop of water placed on the treated paper did not penetrate same until after several minutes. A drop of water placed on untreated medium porosity filter paper was absorbed immediately. Greater water repellency than that noted in this example may be achieved by applying multi-coatings of the polytetrafluoroethylene.

*Example XX*

A piece of polyethylene terephthalate film was coated with a thin layer of the polymer prepared in Example XV. A torn written document was mended with the above-prepared tape and effective repair was achieved. The transparency of the adhesive employed is excellent as evidenced by the fact that the written material was clearly visible through the tape.

The embodiments of the invention in which an exclusive property or privilege is claimed are defined as follows:

1. The class of 2-amino-1,3-butadienes having the formula

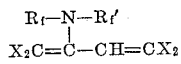

where $R_f$ and $R_f'$ are perfluoro(lower alkyl of 1 to 6 carbon atoms) and X is selected from the group consisting of hydrogen and fluorine.

2. 2-N,N - bis(perfluoromethyl)amino - 1,1,4,4 - tetrafluoro-1,3-butadiene.

3. 2-N,N - bis(perfluoro - n - propyl)amino - 1,1,4,4-tetrafluoro-1,3-butadiene.

4. 2 - (N - perfluoromethyl - N - perfluoroethyl)amino-1,1,4,4-tetrafluoro-1,3-butadiene.

5. 2 - N,N - bis(perfluoromethyl)amino-1,3-butadiene.

6. 2-N,N-bis(perfluoroethyl)amino-1,3-butadiene.

7. 2-N,N-bis(perfluoro-n-propyl)amino-1,3-butadiene.

8. 2-N,N-bis(perfluoro-n-hexyl)amino-1,3-butadiene.

9. 2 - (N - perfluoromethyl - N - perfluoroethyl)amino-1,3-butadiene.

10. 2 - (N - perfluoromethyl - N - perfluoroisopropyl)-amino-1,3-butadiene.

11. 2 - (N - perfluoromethyl - N - perfluoro - n-butyl)-amino-1,3-butadiene.

12. A process for the preparation of the class of 2-amino-1,3-butadienes having the formula

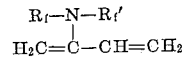

wherein $R_f$ and $R_f'$ are perfluoro(lower alkyl of 1 to 6 carbon atoms) which comprises the steps:

(a) reacting an N-chlorobis(perfluoro lower alkyl of 1 to 6 carbon atoms)amine and butadiene cyclic sulfone, in approximately stoichiometric proportions, under free radical reaction conditions, at a temperature of 0 to 200° C., to form a 3-N,N-bis(perfluoro lower alkyl of 1 to 6 carbon atoms)amino-4-chlorotetrahydrothiophene-1,1-dioxide;

(b) dehydrohalogenating said dioxide of (a) by reacting same in a lower alcohol solvent, at a temperature of 0° to 100° C., with an inorganic base, in approximately stoichiometric proportions, to form a 3-N,N-bis(perfluoro lower alkyl of 1 to 6 carbon atoms)aminodihydrothiophene-1,1-dioxide;

(c) heating the product of (b) to a temperature of 50° to 400° C. until sulfur dioxide evolution ceases;

(d) recovering said 2-amino-1,3-butadiene;

(e) reacting the sulfur dioxide from (c) with butadiene under superatmospheric pressure at a temperature of 20–100° C. to form butadiene cyclic sulfone, and (f) recycling the butadiene cyclic sulfone from (e) to (a).

References Cited

FOREIGN PATENTS 896,347  11/1953  Germany.

OTHER REFERENCES

Knunyants et al.: Chemical Abstracts, vol. 53, (1959), pp. 10207 and 14920e.

CHARLES B. PARKER, *Primary Examiner.*

R. L. RAYMOND, *Assistant Examiner.*